(12) United States Patent
Hayashi et al.

(10) Patent No.: US 11,415,078 B2
(45) Date of Patent: Aug. 16, 2022

(54) COMBINED POWER GENERATION PLANT AND COMBINED POWER GENERATION PLANT CONTROL METHOD

(71) Applicant: MITSUBISHI POWER, LTD., Yokohama (JP)

(72) Inventors: Tomoya Hayashi, Kanagawa (JP); Jun Taguchi, Kanagawa (JP); Satoru Matsuo, Kanagawa (JP); Kei Moriyama, Tokyo (JP); Ken Tamura, Kanagawa (JP); Kentaro Nakamura, Kanagawa (JP); Yuji Ohta, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 17/257,926

(22) PCT Filed: Jul. 12, 2019

(86) PCT No.: PCT/JP2019/027666
§ 371 (c)(1),
(2) Date: Jan. 5, 2021

(87) PCT Pub. No.: WO2020/013309
PCT Pub. Date: Jan. 16, 2020

(65) Prior Publication Data
US 2021/0285396 A1    Sep. 16, 2021

(30) Foreign Application Priority Data

Jul. 13, 2018  (JP) .............................. JP2018-133155

(51) Int. Cl.
*F02G 5/02* (2006.01)
*F01D 1/00* (2006.01)
(Continued)

(52) U.S. Cl.
CPC ................. *F02G 5/02* (2013.01); *F01D 1/00* (2013.01); *F01D 13/00* (2013.01); *F02B 33/00* (2013.01);
(Continued)

(58) Field of Classification Search
CPC ... F01K 23/10; F01K 7/38; F01K 7/24; F01K 23/101; F01K 23/106; F01K 9/003;
(Continued)

(56) References Cited

FOREIGN PATENT DOCUMENTS

JP          S58-161108 U      10/1983
JP          S59-110811 A       6/1984
(Continued)

OTHER PUBLICATIONS

JPH 09-112801 English Translation (Year: 1997).*
(Continued)

*Primary Examiner* — Shafiq Mian
(74) *Attorney, Agent, or Firm* — WHDA, LLP (57) ABSTRACT

In the present invention, a coal gasification combined power generation facility comprises: a feed water supply line (72); a condensate pump (39) and an intermediate-pressure feed water pump (40); a turbine bypass line (32) that bypasses a steam turbine and supplies steam to the condenser (73); and a spray water line (76) that supplies the feed water to the turbine bypass line (32). The coal gasification combined power generation facility has a normal operation mode and a bypass operation mode, and in the bypass operation mode, a control device (80) supplies the feed water to the turbine bypass line (32) and performs a first opening degree control to control the opening degree of the supply adjustment valve so that the amount of feed water supplied to the exhaust heat recovery boiler becomes less than that in the normal operation mode.

6 Claims, 4 Drawing Sheets

(51) Int. Cl.
*F01D 13/00* (2006.01)
*F02B 33/00* (2006.01)

(52) U.S. Cl.
CPC ...... *F02G 2260/00* (2013.01); *F05D 2220/31* (2013.01); *F05D 2260/606* (2013.01); *F05D 2270/00* (2013.01)

(58) Field of Classification Search
CPC ... F01K 9/04; F01D 1/00; F01D 13/00; F02B 33/00; F02G 2260/00; F05D 2220/31; F05D 2260/606; F05D 2270/00
See application file for complete search history.

(56) References Cited

FOREIGN PATENT DOCUMENTS

| JP | H03-281905 A | | 12/1991 |
|----|---|---|---|
| JP | H04-325703 A | | 11/1992 |
| JP | H09-112809 A | | 5/1997 |
| JP | H09-112801 A | | 5/1997 |
| JP | H-09112801 A | * | 5/1997 |
| JP | H-09112809 A | * | 5/1997 |

OTHER PUBLICATIONS

JPH 09112809 A English Translation (Year: 1997).*
International Search Report dated Aug. 27, 2019, issued in counterpart Application No. PCT/JP2019/027666, with English translation. (5 pages).
Written Opinion dated Aug. 27, 2019, issued in counterpart Application No. PCT/JP2019/027666, with English translation. (12 pages).

* cited by examiner

COMBINED POWER GENERATION PLANT AND COMBINED POWER GENERATION PLANT CONTROL METHOD

TECHNICAL FIELD

The present invention relates to a combined cycle power plant and a method for controlling a combined cycle power plant.

BACKGROUND ART

In the related art, as a combined cycle power plant, a combined cycle power plant has been known in which a heat recovery steam generator generates steam using waste heat from an internal combustion engine for power generation and a steam turbine is driven by the steam. In the combined cycle power plant, in a normal operation, water and steam are circulated as follows: the steam which has been used to drive the steam turbine is condensed into feed water by a condenser and the feed water is supplied to the heat recovery steam generator and is converted into steam again.

Some of the combined cycle power plants perform operations different from the normal operation in an operating state different from the normal operation.

For example, in PTL 1, a turbine bypass pipe is provided. When a load cutoff occurs in a plant, a main steam stop valve provided at an inlet of a turbine is closed. At the same time, a turbine bypass valve provided in the turbine bypass pipe is fully opened and steam generated by an evaporator is blown out by the condenser. Further, in PTL 2, when a combustor of a gas turbine misfires, a set value of the level of water in a steam drum of a heat recovery steam generator is reduced and changed at a constant rate.

CITATION LIST

Patent Literature

[PTL 1] Japanese Unexamined Patent Application Publication No. 3-291905
[PTL 2] Japanese Unexamined Patent Application Publication No. 4-325703

SUMMARY OF INVENTION

Technical Problem

As described above, in the combined cycle power plant, in the normal operation, the steam generated by the heat recovery steam generator is supplied to the steam turbine. The steam which has been used to drive the steam turbine is condensed into feed water by the condenser. Then, the feed water is supplied to the heat recovery steam generator through a feed water flow path. In this case, the feed water condensed by the condenser is supplied to the heat recovery steam generator by the driving force of a pump provided in the feed water flow path.

In contrast, the combined cycle power plant includes a turbine bypass flow path which is a flow path for supplying the steam generated by the heat recovery steam generator to the condenser without passing through the steam turbine. For example, at the time of a plant trip, steam is guided to the condenser through the turbine bypass flow path in order to prevent steam from being circulated to a steam turbine system (hereinafter, this operation is referred to as a "bypass operation").

In the bypass operation, high-temperature steam is circulated through the turbine bypass flow path. Therefore, in some cases, the feed water that is circulated through the feed water flow path is supplied to the turbine bypass flow path to reduce the temperature of the steam circulated through the turbine bypass flow path to a predetermined temperature or lower. In this case, in the bypass operation, the feed water is supplied to the heat recovery steam generator and is also supplied to the turbine bypass flow path. Therefore, the amount of feed water used in the bypass operation is more than that in the normal operation in which the feed water is not supplied to the turbine bypass flow path.

Therefore, the capacity and total head of the pump provided in the feed water flow path are designed such that the pump can preferably discharge the amount of feed water used in the bypass operation (the sum of the amount of feed water supplied to the heat recovery steam generator and the amount of feed water supplied to the turbine bypass flow path).

In general, the total head of the pump becomes higher as the amount of discharge becomes smaller than the design capacity. Therefore, in a case in which the pump is designed on the basis of the amount of feed water used in the bypass operation, the total head of the pump is higher than the required total head in the normal operation in which the amount of feed water is less than that in the bypass operation. Therefore, in the normal operation mode, the discharge pressure of the pump is higher than the required pressure, and the driving force of the pump is too high.

Further, in general, the efficiency of the pump becomes lower as the amount of discharge of the pump becomes smaller than the design capacity. Therefore, in a case in which the pump is designed on the basis of the amount of feed water used in the bypass operation, the efficiency of the pump is reduced in the normal operation in which the amount of feed water is less than that in the bypass operation.

PTL 1 and PTL 2 do not disclose the configurations considering the total head of the pump and the efficiency of the pump in operations different from the normal operation. Therefore, the configurations disclosed in PTL 1 and PTL 2 cause the problem that the driving force of the pump is too high in the normal operation or the problem that the efficiency of the pump is reduced. As a result, the energy efficiency of the entire plant is likely to be reduced.

The invention has been made in view of the above-mentioned problems and an object of the invention is to provide a combined cycle power plant and a method for controlling a combined cycle power plant that can improve the energy efficiency of the entire plant.

Solution to Problem

In order to solve the above-mentioned problems, a combined cycle power plant and a method for controlling a combined cycle power plant according to the invention adopts the following means.

According to an aspect of the invention, there is provided a combined cycle power plant in which a heat recovery steam generator generates steam using waste heat from an internal combustion engine for power generation and a steam turbine is driven by the steam generated by the heat recovery steam generator. The combined cycle power plant includes: a condenser that condenses the steam which has been used to drive the steam turbine into feed water; a feed water flow path that supplies the feed water condensed by the condenser to the heat recovery steam generator; a pump that is provided in the feed water flow path and circulates the feed water in the feed water flow path; a flow regulation valve that is provided in the feed water flow path and regulates a flow rate of the feed water supplied to the heat recovery steam generator; a turbine bypass flow path that bypasses the steam turbine and supplies the steam generated by the heat recovery steam generator to the condenser; an extracted water flow path that is branched from the feed water flow path and is connected to the turbine bypass flow path; and a control unit having a normal operation mode that supplies the steam generated by the heat recovery steam generator to the steam turbine and a bypass operation mode that supplies the steam generated by the heat recovery steam generator to the condenser through the turbine bypass flow path. In the bypass operation mode, the control unit supplies the feed water to the turbine bypass flow path through the extracted water flow path and performs first opening degree control to control a degree of opening of the flow regulation valve such that an amount of feed water supplied to the heat recovery steam generator is less than that in the normal operation mode.

In the above-mentioned configuration, the degree of opening of the flow regulation valve is controlled such that the amount of feed water supplied to the heat recovery steam generator in the bypass operation mode is less than that in the normal operation mode. Therefore, the amount of feed water discharged by the pump in the bypass operation mode can be reduced, as compared to the configuration in which the same amount of feed water as that in the normal operation is supplied to the heat recovery steam generator even in the bypass operation mode. As a result, it is possible to reduce the maximum capacity of the pump and thus to reduce the capacity of the pump.

Further, in the above-described configuration, it is possible to reduce the amount of discharge of the pump in the bypass operation mode. Therefore, it is possible to reduce the difference between the amount of discharge of the pump in the bypass operation mode and the amount of discharge of the pump in the normal operation mode. As a result, it is possible to suppress a reduction in the efficiency of the pump in the normal operation mode.

Further, in the above-mentioned configuration, it is possible to reduce the difference between the amount of discharge of the pump in the bypass operation mode and the amount of discharge of the pump in the normal operation mode. Therefore, it is possible to prevent the total head of the pump in the normal operation mode from being higher than necessary. As a result, it is possible to suppress a situation in which the driving force of the pump is too high.

As described above, in the above-mentioned configuration, it is possible to reduce the capacity of the pump, to suppress a reduction in the efficiency of the pump in the normal operation, and to prevent the driving force of the pump from being too high. Therefore, it is possible to improve the energy efficiency of the entire plant.

Further, in the combined cycle power plant according to the aspect of the invention, in the first opening degree control, the control unit may control the degree of opening of the flow regulation valve such that a sum of an amount of feed water supplied to the turbine bypass flow path and the amount of feed water supplied to the heat recovery steam generator is equal to or less than the amount of feed water supplied to the heat recovery steam generator in the normal operation mode.

In the above-mentioned configuration, the degree of opening of the flow regulation valve is controlled such that the sum of the amount of feed water supplied to the turbine bypass flow path and the amount of feed water supplied to the heat recovery steam generator in the bypass operation mode is equal to or less than the amount of feed water supplied to the heat recovery steam generator in the normal operation mode.

With this configuration, the amount of discharge of the pump in the bypass operation mode is equal to or less than the amount of discharge of the pump in the normal operation mode. Therefore, it is possible to set the maximum capacity of the pump to the amount of discharge in the normal operation mode. As a result, the size of the pump can be set to a size corresponding to the amount of discharge in the normal operation mode (that is, the amount of discharge without supplying the feed water to the turbine bypass flow path), which makes it possible to further reduce the capacity of the pump.

In addition, since the amount of discharge in the normal operation mode is equal to or more than the amount of discharge in the bypass operation mode, it is possible to set the pump such that the efficiency of the pump is the maximum at the amount of discharge in the normal operation mode. Therefore, it is possible to improve the efficiency of the pump in the normal operation mode.

Further, since the amount of discharge in the normal operation mode is equal to or more than the amount of discharge in the bypass operation mode, it is possible to set the pump such that a desired total head is obtained at the amount of discharge in the normal operation mode. Therefore, it is possible to set the pump such that the total head of the pump in the normal operation mode is appropriate. As a result, in the normal operation mode, it is possible to prevent the total head of the pump from being higher than necessary.

As described above, in the above-mentioned configuration, it is possible to reduce the capacity of the pump, to improve the efficiency of the pump in the normal operation, and to prevent the driving force of the pump from being too high. Therefore, it is possible to further improve the energy efficiency of the entire plant.

Further, in the combined cycle power plant according to the aspect of the invention, in the bypass operation mode, after performing the first opening degree control, the control unit may control the degree of opening of the flow regulation valve such that an amount of feed water held by the heat recovery steam generator is maintained at a predetermined flow rate.

In the above-mentioned configuration, after the first opening degree control is performed, the degree of opening of the flow regulation valve is controlled such that the amount of feed water held by the heat recovery steam generator is maintained a predetermined flow rate. This configuration prevents a shortage of feed water in the heat recovery steam generator. Therefore, it is possible to avoid problems caused by a reduction in the amount of feed water in the heat recovery steam generator. The problems caused by the reduction in the amount of feed water in the heat recovery steam generator include, for example, the damage of the heat recovery steam generator due to a temperature rise caused by a reduction in the amount of water.

According to another aspect of the invention, there is provided a method for controlling a combined cycle power plant in which a steam turbine is driven by steam generated by a heat recovery steam generator using waste heat from an internal combustion engine for power generation. The combined cycle power plant includes: a condenser that condenses the steam which has been used to drive the steam turbine into feed water; a feed water flow path that supplies the feed water condensed by the condenser to the heat recovery steam generator; a pump that is provided in the feed water flow path and circulates the feed water in the feed water flow path; a flow regulation valve that is provided in the feed water flow path and regulates a flow rate of the feed water supplied to the heat recovery steam generator; a turbine bypass flow path that bypasses the steam turbine and supplies the steam generated by the heat recovery steam generator to the condenser; an extracted water flow path that is branched from the feed water flow path and is connected to the turbine bypass flow path; and a control unit having a normal operation mode that supplies the steam generated by the heat recovery steam generator to the steam turbine and a bypass operation mode that supplies the steam generated by the heat recovery steam generator to the condenser through the turbine bypass flow path. The method includes: a feed water extraction step of supplying the feed water to the turbine bypass flow path through the extracted water flow path in the bypass operation mode; and a first opening degree control step of controlling a degree of opening of the flow regulation valve such that an amount of feed water supplied to the heat recovery steam generator in the bypass operation mode is less than that in the normal operation mode.

Further, in the method for controlling a combined cycle power plant according to the aspect of the invention, in the first opening degree control step, the degree of opening of the flow regulation valve may be controlled such that a sum of an amount of feed water supplied to the turbine bypass flow path and the amount of feed water supplied to the heat recovery steam generator is equal to or less than the amount of feed water supplied to the heat recovery steam generator in the normal operation mode.

Furthermore, the method for controlling a combined cycle power plant according to the aspect of the invention may further include a second opening degree control step of controlling the degree of opening of the flow regulation valve such that an amount of feed water held by the heat recovery steam generator is maintained at a predetermined flow rate after the first opening degree control step in the bypass operation mode.

Advantageous Effects of Invention

According to the invention, it is possible to improve the energy efficiency of the entire plant.

DESCRIPTION OF EMBODIMENTS

Hereinafter, an embodiment of a combined cycle power plant and a method for controlling a combined cycle power plant according to the invention will be described with reference to the drawings.

[Integrated Coal Gasification Combined Cycle]

Figure 1:
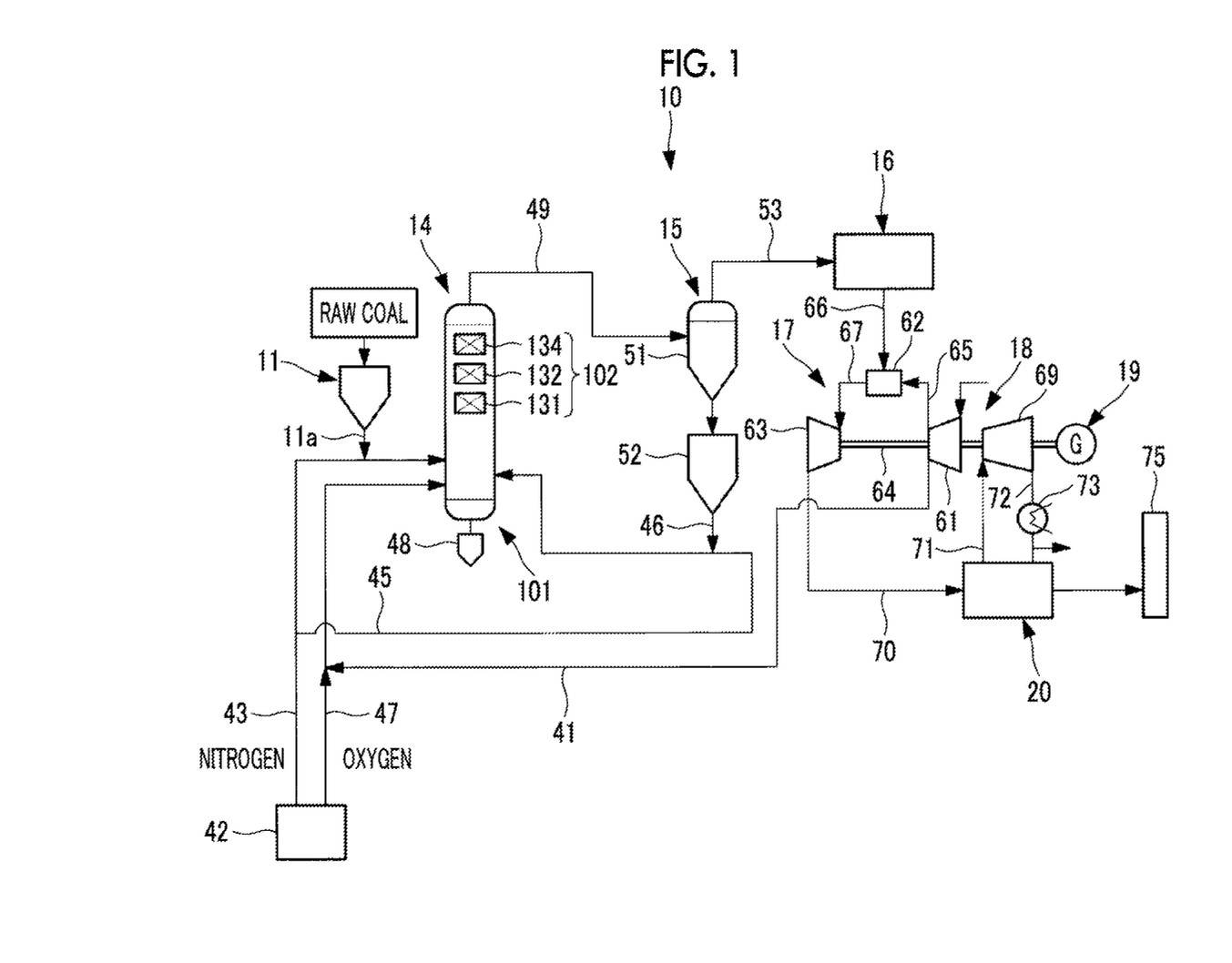
FIG. 1 is a diagram schematically illustrating a configuration of an integrated coal gasification combined cycle according to an embodiment of the invention.

FIG. 1 is a diagram schematically illustrating a configuration of an integrated coal gasification combined cycle to which the combined cycle power plant according to the embodiment of the invention is applied.

An integrated coal gasification combined cycle (IGCC) 10, to which the combined cycle power plant according to this embodiment is applied, adopts an air combustion method in which air or oxygen is used as oxygen containing gas and a gasification unit 14 generates inflammable gas (raw syngas) from fuel. Then, the integrated coal gasification combined cycle 10 purifies the raw syngas generated by the gasification unit 14 into fuel gas using a gas purification unit 16 and then supplies the fuel gas to a gas turbine (internal combustion engine) 17 for power generation to generate power. That is, the integrated coal gasification combined cycle 10 according to this embodiment is an air-combustion-type (air-blown) power generation facility. For example, carbon-containing solid fuel, such as coal, is used as the fuel supplied to the gasification unit 14.

As illustrated in FIG. 1, the integrated coal gasification combined cycle (combined cycle power plant) 10 includes a coal feeding unit 11, the gasification unit 14, a char recovery unit 15, the gas purification unit 16, a gas turbine 17, a steam turbine 18, a generator 19, and a heat recovery steam generator (HRSG) 20.

The coal feeding unit 11 is supplied with coal, which is carbon-containing solid fuel, as raw coal and pulverizes the coal into fine particles with a coal mill (not illustrated) or the like to produce pulverized coal. The pulverized coal produced by the coal feeding unit 11 is pressurized by nitrogen gas as a carrier inert gas which is supplied from an air separation unit (ASU) 42, which will be described below, at the outlet of a coal feeding line 11a and is supplied to the gasification unit 14. The inert gas is an inert gas having an oxygen content of about 5% by volume or less. The representative examples of the inert gas are nitrogen gas, carbon dioxide gas, and argon gas. However, the oxygen content is not necessarily limited to about 5% or less.

The pulverized coal produced by the coal feeding unit 11 is supplied to the gasification unit 14. In addition, the char (unreacted coal and ash) recovered by the char recovery unit 15 is returned and supplied to the gasification unit 14 such that it can be reused.

In addition, a compressed air supply line 41 from the gas turbine 17 (compressor 61) is connected to the gasification unit 14 such that a portion of the compressed air compressed by the gas turbine 17 can be supplied to the gasification unit 14. The air separation unit 42 separates and generates nitrogen and oxygen from air in the atmosphere A first nitrogen supply line 43 connects the air separation unit 42 and the gasification unit 14. Then, the coal feeding line 11a from the coal feeding unit 11 is connected to the first nitrogen supply line 43. Further, a second nitrogen supply line 45 branched from the first nitrogen supply line 43 is also connected to the gasification unit 14. A char return line 46 from the char recovery unit 15 is connected to the second nitrogen supply line 45. Furthermore, the air separation unit 42 is connected to the compressed air supply line 42 by an oxygen supply line 47. Then, the nitrogen separated by the air separation unit 42 is circulated through the first nitrogen supply line 43 and the second nitrogen supply line 45 and is used as a carrier gas for coal or char. Further, the oxygen separated by the air separation unit 42 is circulated through the oxygen supply line 47 and the compressed air supply line 41 and is used as oxygen containing gas in the gasification unit 14.

The gasification unit 14 includes, for example, a gasifier 101 of a two-stage entrained bed type. The gasification unit 14 partially burns the coal (pulverized coal) and the char supplied thereinto with the oxygen containing gas (air and oxygen) so as to be gasified and produces raw syngas. In addition, the gasification unit 14 is provided with a foreign matter removal unit 48 that removes a foreign matter (slag) mixed in the pulverized coal Then, a raw syngas line 48 that supplies the raw syngas to the char recovery unit 15 is connected to the gasification unit 14 such that the raw syngas containing the char can be discharged. Further, a syngas cooler 102 (gas cooler) is provided in the gasifier 101. Therefore, the raw syngas is cooled to a predetermined temperature and is then supplied to the gas purification unit 16. In addition, the configuration of cooling the raw syngas is not limited to the syngas cooler 102. For example, a configuration in which the raw syngas is cooled by quench gas or water may be used.

The char recovery unit 15 includes a dust collection unit 51 and a supply hopper 52. In this case, the dust collection unit 51 includes one or more cyclones or porous filters and can separate the char contained in the raw syngas generated by the gasification unit 14. Then, the raw syngas from which the char has been separated is sent to the gas purification unit 16 through a gas discharge line 53. The supply hopper 52 stores the char separated from the raw syngas by the dust collection unit 51. In addition, a bin may be disposed between the dust, collection unit 51 and the supply hopper 52, and a plurality of supply hoppers 52 may be connected to the bin. Then, the char return line 46 from the supply hopper 52 is connected to the second nitrogen supply line 45.

In addition, the char recovery unit 15 may be omitted, and a flow path that directly connects the gasifier 101 and the gas purification unit 16 may be provided.

The gas purification unit 16 removes impurities, such as sulfur compounds and nitrogen compounds, from the raw syngas, from which the char has been separated by the char recovery unit 15, to purify the gas. Then, the gas purification unit 16 purifies the raw syngas to produce a fuel gas and supplies the fuel gas to the gas turbine 17. In addition, since the raw syngas, from which the char has been separated, still contains a sulfur content (for example, $H_2S$), the gas purification unit 16 removes and recovers the sulfur content with an amine absorbing solution or the like and effectively uses the sulfur content.

The gas turbine 17 includes the compressor 61, a combustor 62, and a turbine 63. The compressor 61 and the turbine 63 are connected by a rotary shaft 64. A compressed air supply line 65 from the compressor 61 is connected to the combustor 62. In addition, a fuel gas supply line 66 from the gas purification unit 16 and a combustion gas supply line 67 extending toward the turbine 63 are connected to the combustor 62. Further, the gas turbine 17 is provided with the compressed air supply line 41 that extends from the compressor 61 to the gasification unit 14. Therefore, in the combustor 62, a portion of the compressed air supplied from the compressor 61 and at least a portion of the fuel gas supplied from the gas purification unit 16 are mixed and burned to generate a combustion gas. The generated combustion gas is supplied to the turbine 63. Then, in the turbine 63, the rotary shaft 64 is rotationally driven by the supplied combustion gas to rotationally drive the generator 19.

The steam turbine 18 includes a turbine 69 that is connected to the rotary shaft 64 of the gas turbine 17, and the generator 19 is connected to a base end portion of the rotary shaft 64. The heat recovery steam generator 20 is connected to a flue gas line 70 from the gas turbine 17 (turbine 63) and performs heat exchange between feed water and the flue gas of the turbine 63 to generate steam. Then, a steam supply line 71 that supplies steam to the steam turbine 18 and a feed water supply line 72 connecting a condenser 73 that condenses the steam which has been used to drive the steam turbine 18 into feed water and the heat recovery steam generator 20 are provided between the heat recovery steam generator 20 and the turbine 69 of the steam turbine 18. Further, the steam generated by the heat recovery steam generator 20 may include steam generated by heat exchange with the raw syngas in the syngas cooler 102 of the gasifier 101. Therefore, in the steam turbine 13, the turbine 69 is rotationally driven by the steam supplied from the heat recovery steam generator 20 to rotate the rotary shaft 64, thereby rotationally driving the generator 19. In addition, for example, flow paths through which steam and water are circulated will be described in detail below.

Further, the example in which the turbine 69 of the steam turbine 18 is connected to the rotary shaft 64 of the gas turbine 17 has been described. However, the invention is not limited thereto. That is, the steam turbine 18 and the gas turbine 17 may not be provided so as to be connected to one shaft, but may be connected to different shafts. For example, a shaft different from the rotary shaft 64 may be connected to the turbine 69 and may be connected to the rotary shaft 64 through a connecting member or the like.

Then, the heat recovery steam generator 20 is provided with a gas clean-up unit (not illustrated). The flue gas cleaned up by the gas clean-up unit is guided to a chimney 75 through a flow path that connects the heat recovery steam generator 20 and the chimney 75.

Here, the operation of the integrated coal gasification combined cycle 10 according to this embodiment will be described.

In the integrated coal gasification combined cycle 10 according to this embodiment, when raw coal (coal) is supplied to the coal feeding unit 11, the coal is pulverized into fine particles in the coal feeding unit 11 to become pulverized coal. The pulverized coal produced by the coal feeding unit 11 is circulated through the first nitrogen supply line 43 by the nitrogen supplied from the air separation unit 42 and is supplied to the gasification unit 14. In addition, the char recovered by the char recovery unit 15, which will be described below, is circulated through the second nitrogen supply line 45 by the nitrogen supplied from the air separation unit 42 and is supplied to the gasification unit 14. Further, the compressed air is supplied to the gasification unit 14 through the compressed air supply line 41 together with the oxygen supplied from the air separation unit 42.

In the gasification unit 14, the supplied pulverized coal and char are partially burned by the compressed air (oxygen), and the pulverized coal and the char are gasified to generate a raw syngas. Then, the raw syngas is discharged from the gasification unit 14 through the raw syngas line 49 and is sent to the char recovery unit 15.

In the char recovery unit 15, first, the raw syngas is supplied to the dust collection unit 51 and the fine-grained char contained in the raw syngas is separated. Then, the raw syngas from which the char has been separated is sent to the gas purification unit 16 through the gas discharge line 53. In contrast, the fine-grained char separated from the raw syngas is accumulated in the supply hopper 52, is returned to the gasification unit 14 through the char return line 46, and is recycled.

The gas purification unit 16 removes impurities, such as sulfur compounds and nitrogen compounds, from the raw syngas from which the char has been separated by the char recovery unit 15 to purify the gas, thereby producing a fuel gas. The compressor 61 generates compressed air and supplies the compressed air to the combustor 62. The combustor 62 mixes the compressed air supplied from the compressor 61 and the fuel gas supplied from the gas purification unit 16 and burns the mixed gas to generate a combustion gas. The turbine 63 is rotationally driven by the combustion gas to rotationally drive the compressor 61 and the generator 19 through the rotary shaft 64. In this way, the gas turbine 17 can generate power.

Then, the heat recovery steam generator 20 performs heat exchange between the flue gas discharged from the turbine 63 of the gas turbine 17 and the feed water to generate steam and supplies the generated steam to the steam turbine 18. In the steam turbine 18, the turbine 65 is rotationally driven by the steam supplied from the heat recovery steam generator 20 to rotationally drive the generator 19 through the rotary shaft 64, which makes it possible to generate power.

In addition, the gas turbine 17 and the steam turbine 18 may not be connected to the same shaft to rotationally drive one generator 19, but may be connected to different shafts to rotationally drive a plurality of generators.

Then, the gas clean-up unit removes harmful substances of the flue gas discharged from the heat recovery steam generator 20, and cleaned-up flue gas is discharged from the chimney 75 to the atmosphere.

Next, the gasification unit 14 in the integrated coal gasification combined cycle 10 will be described in detail.

The gasification unit 14 includes the gasifier 101 and the syngas cooler 102.

The gasifier 101 is formed so as to extend in the vertical direction. The pulverized coal and oxygen are supplied to the lower side in the vertical direction. The raw syngas which has been partially burned and gasified is circulated from the lower side to the upper side in the vertical direction.

The syngas cooler 102 is a heat exchanger, and includes an evaporator 131, a superheater 132, and an economizer 134 provided in this order from the lower side (the upstream side in the circulation direction of the raw syngas) in the vertical direction. The syngas cooler 102 performs heat exchange with the raw syngas generated in the gasifier 101 (specifically, a reductor portion (not illustrated)) to cool the raw syngas. Further, the numbers of evaporators 131, superheaters 132, and economizers 134 are not limited to those illustrated in the drawings.

Furthermore, the arrangement order of heat exchangers is an example and is not limited thereto.

Figure 2:
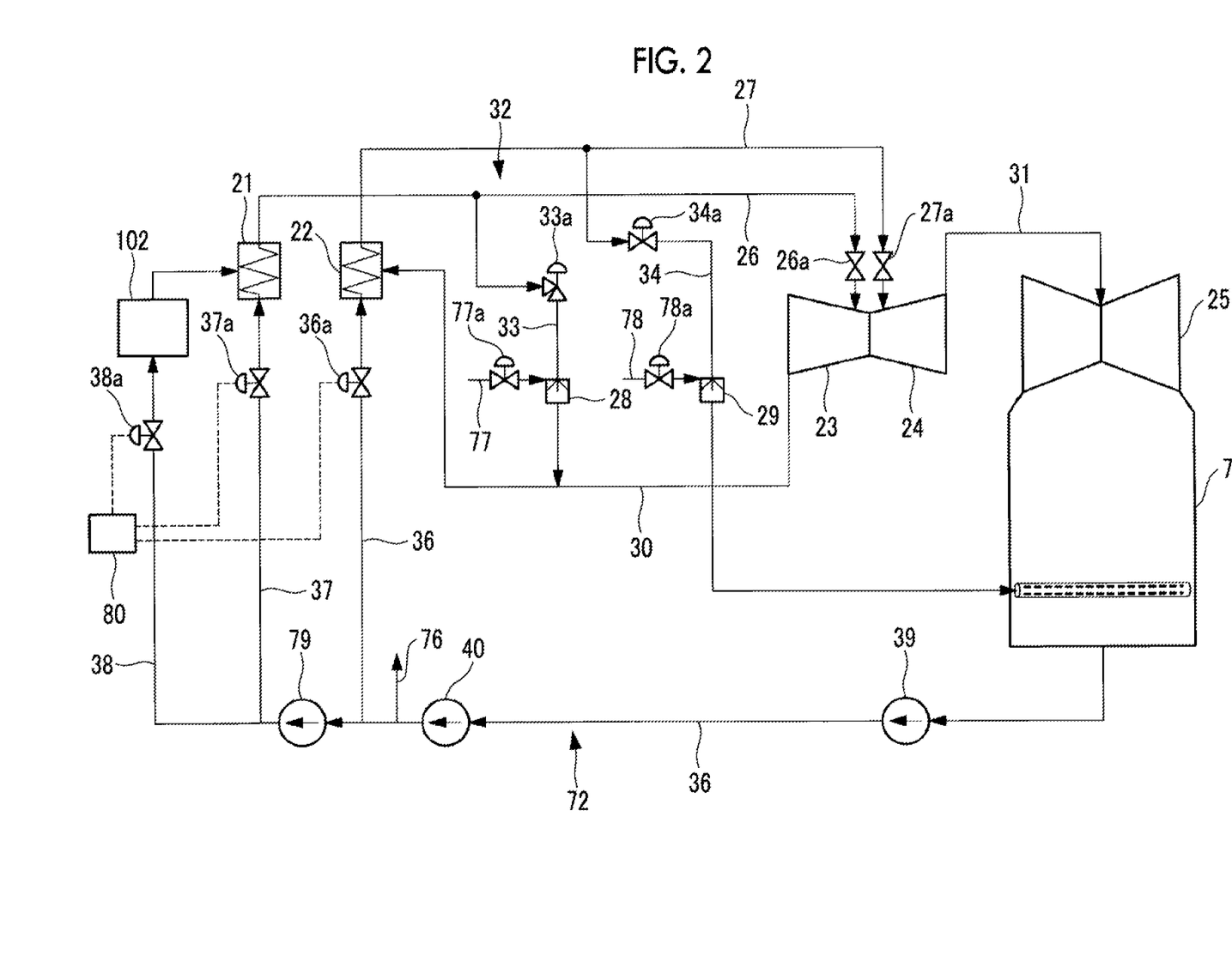
FIG. 2 is a diagram schematically illustrating a configuration of a main portion of FIG. 1.

Next, a configuration related to the circulation of water and steam in the integrated coal gasification combined cycle 10 will be described in detail with reference to FIG. 2. FIG. 2 is a diagram schematically illustrating the configuration of a water and steam system of the integrated coal gasification combined cycle 10 illustrated in FIG. 1.

As described above, the heat recovery steam generator 20 generates steam using the heat of the flue gas from the gas turbine 17. As illustrated in FIG. 2, specifically, the heat recovery steam generator 20 according to this embodiment includes a high-pressure heat recovery steam generator 21 and a medium-pressure heat recovery steam generator 22. The high-pressure heat recovery steam generator 21 and the medium-pressure heat recovery steam generator 22 are disposed in this order from the upstream side to the downstream side in the circulation direction of the flue gas supplied to the heat recovery steam generator 20.

In addition, the configuration of the heat recovery steam generator 20 is an example and is not limited thereto. For example, the medium-pressure heat recovery steam generator and the high-pressure heat recovery steam generator may foe disposed in this order from the upstream side to the downstream side in the circulation direction of the flue gas. In addition, a plurality of medium-pressure steam generators and a plurality of high-pressure steam generators may be provided, and a high-pressure evaporator, a medium-pressure superheater, a high-pressure secondary superheater, and a medium-pressure evaporator may be disposed in this order from the upstream side to the downstream side in the circulation direction of flue gas.

The steam turbine 18 to which the steam generated by the heat recovery steam generator 20 is supplied is driven by the supplied steam to generate power. Specifically, the steam turbine 13 according to this embodiment includes a high-pressure steam turbine 23, a medium-pressure steam turbine 24, and a low-pressure steam turbine 25, as illustrated in FIG. 2.

The heat recovery steam generator 20 and the steam turbine 18 are connected by the steam supply line 71. Specifically, the steam supply line 71 includes a high-pressure steam supply line 26 that connects an outlet of the high-pressure heat recovery steam generator 21 and an inlet of the high-pressure steam turbine 23 and a medium-pressure steam supply line 27 that connects an outlet of the medium-pressure heat recovery steam generator 22 and an inlet of the medium-pressure steam turbine 24.

The high-pressure steam supply line 26 supplies the steam generated by the high-pressure heat recovery steam generator 21 to the high-pressure steam turbine 23. In addition, a high-pressure steam valve 26a is provided at an intermediate position of the high-pressure steam supply line 26. The medium-pressure steam supply line 27 supplies the steam generated by the medium-pressure heat recovery steam generator 22 to the medium-pressure steam turbine 24. Further, a medium-pressure steam valve 27a is provided at an intermediate position of the medium-pressure steam supply line 27. Furthermore, the high-pressure steam valve 26a and the medium-pressure steam valve 27a may be flow regulation valves or opening-closing valves.

In addition, an outlet of the high-pressure steam turbine 23 and the medium-pressure heat recovery steam generator 22 are connected by a reheat steam line 30. The reheat steam line 30 guides the steam, which has been used to drive the high-pressure steam turbine 23, to the medium-pressure heat recovery steam generator 22. Further, an outlet of the medium-pressure steam turbine 24 and an inlet of the low-pressure steam turbine 25 are connected by a steam flow path 31. The steam flow path 31 guides the steam, which has been used to drive the medium-pressure steam turbine 24, to the low-pressure steam turbine 25. In addition, the steam which has been used to drive the low-pressure steam turbine 25 is supplied to the condenser 73 without any change.

The condenser 73 cools the supplied steam to condense the steam into feed water. Specifically, the steam that has been used to drive the low-pressure steam turbine 25 and the steam from the medium-pressure bypass line 34, which will be described below, are condensed.

Further, the integrated coal gasification combined cycle 10 is provided with a turbine bypass line (turbine bypass flow path) 32 that bypasses the steam turbine 18 and supplies the steam generated by the heat recovery steam generator 20 to the condenser 73. Specifically, the turbine bypass line 32 includes a high-pressure bypass line 33 that connects the upstream side of the high-pressure steam valve 26a in the high-pressure steam supply line 26 and the reheat steam line 30 and a medium-pressure bypass line 34 that connects the upstream side of the medium-pressure steam valve 27a in the medium-pressure steam supply line 27 and the condenser 73.

The high-pressure bypass line 33 is provided with a high-pressure bypass valve 33a and a first spray portion 28 that jets the feed water to the steam circulated in the high-pressure bypass line 33. Further, the high-pressure bypass line 33 can supply the steam circulated through the high-pressure steam supply line 26 to the reheat steam line 30. The medium-pressure bypass line 34 is provided with a medium-pressure bypass valve 34a and a second spray portion 29 that jets the feed water to the steam circulated in the medium-pressure bypass line 34. Further, the medium-pressure bypass line 34 can supply the steam circulated through the medium-pressure steam supply line 27 to the condenser 73. The high-pressure bypass valve 33a and the medium-pressure bypass valve 34a may be flow regulation valves or opening-closing valves.

The feed water supply line 72 supplies the feed water condensed by the condenser 73 to the heat recovery steam generator 20. Specifically, the feed water supply line 72 includes a medium-pressure feed water supply line (feed water flow path) 36 that connects the condenser 73 and the medium-pressure heat recovery steam generator 22 and a high-pressure feed water supply line (feed water flow path) 37 that is branched from the medium-pressure feed water supply line 36 and is connected to the high-pressure heat recovery steam generator 21.

The medium-pressure feed water supply line 36 is provided with a medium-pressure water supply pump 40. The medium-pressure water supply pump 40 is provided on the upstream side of a branch portion of the high-pressure feed water supply line 37 in the circulation direction of the feed water. The feed water circulated in the medium-pressure feed water supply line 36 by the driving force of a condensate pump (pump) 39 and the medium-pressure water supply pump (pump) 40. In addition, in this embodiment, the condensate pump 39 and the medium-pressure water supply pump 40 are designed such that the condensate pump 39 and the medium-pressure water supply pump 40 perform a rated operation in a normal operation mode which will be described below.

Further, in the medium-pressure feed water supply line 36, a spray water line (extracted water flow path) 76 is branched from the downstream side of the medium-pressure water supply pump 40 and the upstream side of a branch portion of the high-pressure feed water supply line 37. Furthermore, the medium-pressure feed water supply line 36 is provided with a medium-pressure water supply regulation valve (flow regulation valve) 36a on the downstream side of the branch portion of the high-pressure feed water supply line 37. The medium-pressure water supply regulation valve 36a is a flow regulation valve that regulates the flow rate of the feed water flowing inside the medium-pressure feed water supply line 36. That is, the medium-pressure water supply regulation valve 36a regulates the flow rate of the feed water supplied to the medium-pressure heat recovery steam generator 22.

The spray water line 76 is branched into a first spray water line 77 that is connected to the first spray portion 28 and a second spray water line 78 that is connected to the second spray portion 28 at an intermediate position. The first spray water line 77 is provided with a first spray water valve 77a. Further, the second spray water line 78 is provided with a second spray water valve 78a. The first spray water valve 77a and the second spray water valve 73a may be flow regulation valves or opening-closing valves.

The high-pressure feed water supply line 37 is provided with a high-pressure water supply pump 79. The feed water in the high-pressure feed water supply line 37 is circulated by the driving force of the high-pressure water supply pump 79 in addition to the driving force of the condensate pump 39 and the medium-pressure water supply pump 40.

Further, the high-pressure feed water supply line 37 is provided with a high-pressure water supply regulation valve (flow regulation valve) 37a on the downstream side of the high-pressure water supply pump 79. The high-pressure water supply regulation valve 37a is a flow regulation valve that regulates the flow rate of the feed water circulated in the high-pressure feed water supply line 37. That is, the high-pressure water supply regulation valve 37a regulates the flow rate of the feed water supplied to the high-pressure heat recovery steam generator 21. Further, in the high-pressure feed water supply line 37, a syngas cooler feed water supply line 38 is branched from the downstream side of the high-pressure water supply pump 79 and the upstream side of the high-pressure water supply regulation valve 37a.

The syngas cooler feed water supply line 38 supplies the feed water to the syngas cooler 102. Further, a syngas cooler water supply regulation valve 38a is provided in the syngas cooler feed water supply line 38. The syngas cooler water supply regulation valve 38a is a flow regulation valve that regulates the flow rate of the feed water circulated in the syngas cooler feed water supply line 38. That is, the syngas cooler water supply regulation valve 38a regulates the flow rate of the feed water supplied to the syngas cooler 102. In addition, the feed water in the syngas cooler feed water supply line 38 is circulated by the driving force of the condensate pump 39, the medium-pressure water supply pump 40, and the high-pressure water supply pump 79.

Further, the integrated coal gasification combined cycle 10 is provided with a control device (control unit) 80 that controls each valve provided in the integrated coal gasification combined cycle 10.

The control device 80 includes, for example, a central processing unit (CPU), a random access memory (RAM), a read only memory (ROM), and a computer-readable storage medium. Then, a series of processes for implementing various functions is stored in the storage medium or the like in the form of a program as an example. The CPU reads the program into the RAM or the like and performs information processing and arithmetic processing to implement various functions. In addition, the following forms may be applied to the program: a form in which the program is installed in the ROM or other storage media in advance; a form in which the program is provided in a state of being stored in the computer-readable storage medium; and a form in which the program is distributed through a wired or wireless communication means. Examples of the computer-readable storage medium include a magnetic disk, a magneto-optical disk, a CD-ROM, a DVD-ROM, and a semiconductor memory.

Further, the control device 80 controls, for example, various valves to perform a normal operation mode and a bypass operation mode which are operation modes of the integrated coal gasification combined cycle 10.

The normal operation mode is an operation mode that is performed when power is generated by the driving force of the gas turbine 17 and the steam turbine 18. The normal operation mode is an operation mode that repeats the circulation of water and steam in which the steam generated by the heat recovery steam generator 20 (high-pressure heat recovery steam generator 21 and the medium-pressure heat recovery steam generator 22) is supplied to the steam turbine 18 to drive the steam turbine 18, thereby generating power;

the steam that has been used to drive the steam turbine 18 is condensed into feed water by the condenser 73; and the feed water is supplied to the heat recovery steam generator 20 (the high-pressure heat recovery steam generator 21 and the medium-pressure heat recovery steam generator 22) and the syngas cooler 102 to be converted into steam. That is, in the normal operation mode, the control device 80 opens the high-pressure steam valve 26a, the medium-pressure steam valve 27a, the medium-pressure water supply regulation valve 36a, the high-pressure water supply regulation valve 37a, and the syngas cooler water supply regulation valve 38a, and closes the high-pressure bypass valve 33a, the medium-pressure bypass valve 34a, the first spray water valve 77a, and the second spray water valve 78a. In addition, in the normal operation mode, the control device 80 controls the degrees of opening of the medium-pressure water supply regulation valve 36a, the high-pressure water supply regulation valve 37a, and the syngas cooler water supply regulation valve 38a such that the levels of water in drums (not illustrated) provided in the medium-pressure heat recovery steam generator 22, the high-pressure heat recovery steam generator 21, and the syngas cooler 102 are maintained at a constant level.

The bypass operation mode is an operation mode that is performed before steam conditions are established when the integrated coal gasification combined cycle 10 is started or when the integrated coal gasification combined cycle 10 is tripped. The bypass operation mode is an operation mode in which the steam generated by the heat recovery steam generator 20 (the high-pressure heat recovery steam generator 21 and the medium-pressure heat recovery steam generator 22) is supplied to the condenser 73 through the turbine bypass line 32. That is, in the bypass operation mode, the steam generated by the heat recovery steam generator 20 is supplied to the condenser 73 without passing through the steam turbine 13. Further, in the bypass operation mode, the feed water supplied from the condenser 73 is supplied to the medium-pressure heat recovery steam generator 22, the high-pressure heat recovery steam generator 21, and the syngas cooler 102. In addition, a predetermined amount of feed water is supplied to the first spray portion 28 and the second spray portion 29 through the spray water line 76 (feed water extraction step). That is, in the bypass operation mode, the control device 80 performs control to close the high-pressure steam valve 26a and the medium-pressure steam valve 27a and to open the medium-pressure water supply regulation valve 36a, the high-pressure water supply regulation valve 37a, the syngas cooler water supply regulation valve 33a, the high-pressure bypass valve 33a, the medium-pressure bypass valve 34a, the first spray water valve 77a, and the second spray water valve 78a.

In addition, the control device 80 performs first opening degree control (first opening degree control step) to regulate the degrees of opening of the medium-pressure water supply regulation valve 36a, the high-pressure water supply regulation valve 37a, and the syngas cooler water supply regulation valve 38a (regulation to reduce the degrees of opening in this embodiment) such that the amount of feed water supplied to the medium-pressure heat recovery steam generator 22, the high-pressure heat recovery steam generator 21, and the syngas cooler 102 in the bypass operation mode is less than that in the normal operation mode. More preferably, in the first opening degree control, the control device 80 performs control to reduce the degrees of opening of the medium-pressure water supply regulation valve 36a, the high-pressure water supply regulation valve 37a, and the syngas cooler water supply regulation valve 38a such that the sum of the amount of feed water supplied to the medium-pressure bypass line 34 and the high-pressure bypass line 33 through the first spray portion 28 and the second spray portion 29 and the amount of feed water supplied to the medium-pressure heat recovery steam generator 22, the high-pressure heat recovery steam generator 21, and the syngas cooler 102 is equal to or less than the amount of feed water supplied to the medium-pressure heat recovery steam generator 22, the high-pressure heat recovery steam generator 21, and the syngas cooler 102 in the normal operation mode. In other words, in the first opening degree control, the control device 80 performs control to reduce the degrees of opening of the medium-pressure water supply regulation valve 36a, the high-pressure water supply regulation valve 37a, and the syngas cooler water supply regulation valve 38a such that the amount of discharge of the condensate pump 39 and the medium-pressure water supply pump 40 in the bypass operation mode is equal to or less than the amount of discharge of the condensate pump 39 and the medium-pressure water supply pump 40 in the normal operation mode.

Further, in this embodiment, the degrees of opening of the medium-pressure water supply regulation valve 36a, the high-pressure water supply regulation valve 37a, and the syngas cooler water supply regulation valve 38a are uniformly regulated at the same timing.

In addition, the degrees of opening of the medium-pressure water supply regulation valve 36a, the high-pressure water supply regulation valve 37a, and the syngas cooler water supply regulation valve 38a may be uniformly regulated as described above, or may be regulated to be different from each other.

Further, the control device 80 performs second opening degree control (second opening degree control step) to control the degrees of opening of the medium-pressure water supply regulation valve 36a, the high-pressure water supply regulation valve 37a, and the syngas cooler water supply regulation valve 38a such that the level of water in each drum provided in the medium-pressure heat recovery steam generator 22, the high-pressure heat recovery steam generator 21, and the syngas cooler 102 is maintained at a predetermined level of water (that is, the amount of feed water held in the medium-pressure heat recovery steam generator 22, the high-pressure heat recovery steam generator 21, and the syngas cooler 102 is maintained at a predetermined flow rate) after the lapse of a predetermined time since the first opening degree control in the bypass operation mode.

Figure 3:
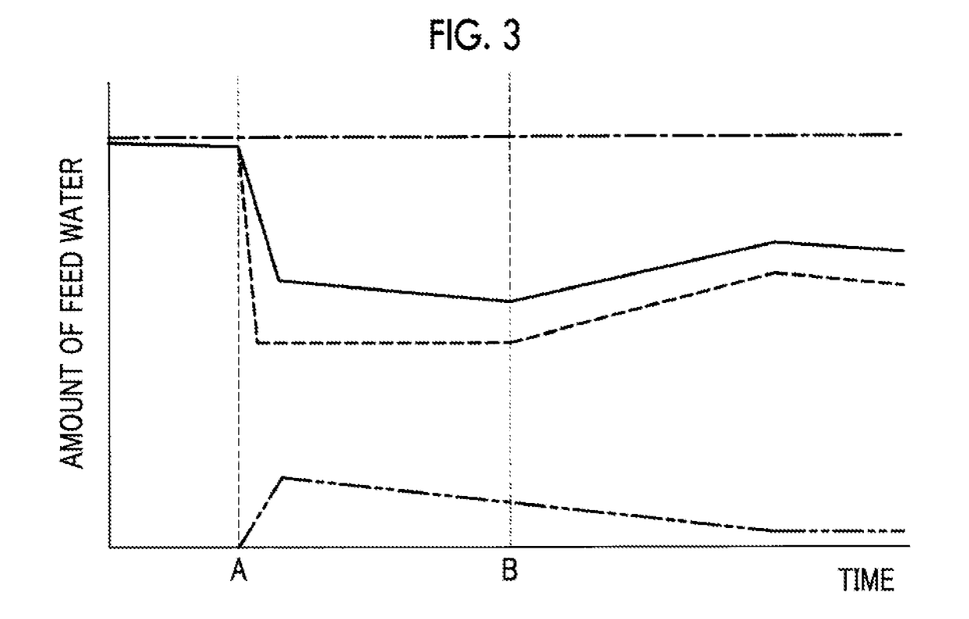
FIG. 3 is a graph illustrating a relationship between the amount of feed water supplied to each system and time.

The amount of feed water in each system in the bypass operation mode will be described in detail with reference to FIG. 3. In FIG. 3, the vertical axis indicates the amount of feed water and the horizontal axis indicates time. Further, A on the horizontal axis indicates the start of the bypass operation mode (that is, the start of the first opening degree control), and B on the horizontal axis indicates the start of the second opening degree control.

Furthermore, a two-dot chain line in FIG. 3 indicates a change in the amount of feed water supplied to the first spray portion 28 and the second spray portion 29. A dashed line indicates a change in the amount of feed water supplied to the medium-pressure heat recovery steam generator 22, the high-pressure heat recovery steam generator 21, and the syngas cooler 102. A solid line indicates a change in the sum (that is, the amount of discharge of the condensate pump 39 and the medium-pressure water supply pump 40) of the amount of feed water supplied to the first spray portion 28 and the second spray portion 29 and the amount of feed water supplied to the medium-pressure heat recovery steam generator 22, the high-pressure heat recovery steam generator 21, and the syngas cooler 102. In addition, a one-dot chain line is a line for reference and indicates the amount of discharge of the condensate pump 39 and the medium-pressure water supply pump 40 in the normal operation.

Before the bypass operation mode is started, the operation is performed in the normal operation mode. Therefore, a constant amount of feed water is supplied to the medium-pressure heat recovery steam generator 22, the high-pressure heat recovery steam generator 21, and the syngas cooler. Further, since the first spray water valve 77a and the second spray water valve 78a are closed, the amount of feed water supplied to the first spray portion 28 and the second spray portion 29 is zero.

When the bypass operation mode is started, the amount of water supplied to the first spray portion 28 and the second spray portion 29 increases as represented by the two-dot chain line. The reason is that, when the bypass operation mode is started, the control device 80 opens the first spray water valve 77a and the second spray water valve 78a.

In addition, when the bypass operation mode is started, the amount of feed water supplied to the medium-pressure heat recovery steam generator 22, the high-pressure heat recovery steam generator 21, and the syngas cooler 102 is reduced, as represented by the dashed line. The reason is that, when the bypass operation mode is started, the control device 80 performs the first opening degree control to reduce the degrees of opening of the medium-pressure water supply regulation valve 36a, the high-pressure water supply regulation valve 37a, and the syngas cooler water supply regulation valve 38a. Further, when the second opening degree control is performed, the amount of feed water supplied to the medium-pressure heat recovery steam generator 22, the high-pressure heat recovery steam generator 21, and the syngas cooler 102 increases. The reason is that control is performed to increase the degrees of opening of the medium-pressure water supply regulation valve 36a, the high-pressure water supply regulation valve 37a, and the syngas cooler water supply regulation valve 38a in order to return the level of water in each drum provided in the medium-pressure heat recovery steam generator 22, the high-pressure heat recovery steam generator 21, and the syngas cooler 102 to a predetermined level of water.

Further, when the bypass operation mode is started, the amount of discharge of the condensate pump 39 and the medium-pressure water supply pump 40 is also reduced, as represented by the solid line. The reason is that control is performed to reduce the degrees of opening of the medium-pressure water supply regulation valve 36a, the high-pressure water supply regulation valve 37a, and the syngas cooler water supply regulation valve 38a such that the amount of discharge of the condensate pump 39 and the medium-pressure water supply pump 40 in the bypass operation mode is equal to or less than the amount of discharge of the condensate pump 39 and the medium-pressure water supply pump 40 in the normal operation mode.

Figure 4:
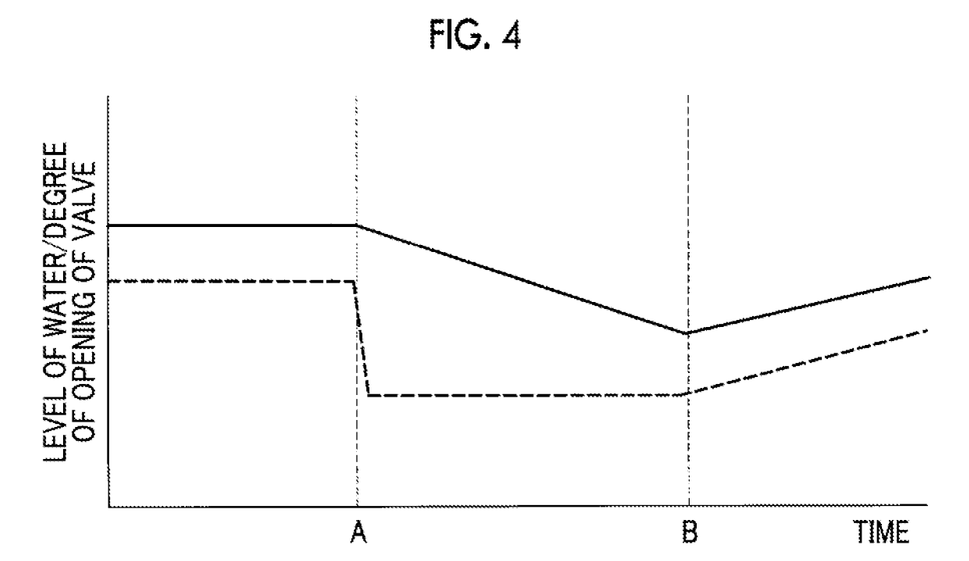
FIG. 4 is a graph illustrating a relationship between the degree of opening of each water supply regulation valve and the level of water in each drum.

Next, the relationship between the degrees of opening of the medium-pressure water supply regulation valve 36a, the high-pressure water supply regulation valve 37a, and the syngas cooler water supply regulation valve 33a and the level of water in each drum provided in the medium-pressure heat recovery steam generator 22, the high-pressure heat recovery steam generator 21, and the syngas cooler 102 in the bypass operation mode will be described with reference to FIG. 4. In FIG. 4, the vertical axis indicates the level of water in the drum or the degree of opening of the valve, and the horizontal axis indicates time. Further, A on the horizontal axis indicates the start of the bypass operation mode (that is, the start of the first opening degree control), and B on the horizontal axis indicates the start of the second opening degree control. In addition, a solid line in FIG. 4 indicates the level of feed water in each drum provided in the medium-pressure heat recovery steam generator 22, the high-pressure heat recovery steam generator 21, and the syngas cooler 102. Further, a dashed line indicates the degrees of opening of the medium-pressure water supply regulation valve 36a, the high-pressure water supply regulation valve 37a, and the syngas cooler water supply regulation valve 38a.

Before the bypass operation mode is started, the operation is performed in the normal operation mode. In the normal operation mode, the control device 80 controls the medium-pressure water supply regulation valve 36a, the high-pressure water supply regulation valve 37a, and the syngas cooler water supply regulation valve 38a such that the level of water in each of the drums provided in the medium-pressure heat recovery steam generator 22, the high-pressure heat recovery steam generator 21, and the syngas cooler 102 is maintained a predetermined level of water. Therefore, the level of water is kept constant.

When the bypass operation mode is started, the control device 80 performs the first opening degree control. Therefore, the degrees of opening of the medium-pressure water supply regulation valve 36a, the high-pressure water supply regulation valve 37a, and the syngas cooler water supply regulation valve 38a are reduced. Even during the first opening degree control, steam is generated in the medium-pressure heat recovery steam generator 22, the high-pressure heat recovery steam generator 21, and the syngas cooler 102. Therefore, in the bypass operation mode, the level of feed water is gradually reduced. Further, when the control device 80 performs the second opening degree control, it performs control to increase the degrees of opening of the medium-pressure water supply regulation valve 36a, the high-pressure water supply regulation valve 37a, and the syngas cooler water supply regulation valve 38a in order to return the level of water in each drum provided in the medium-pressure heat recovery steam generator 22, the high-pressure heat recovery steam generator 21, and the syngas cooler 102 to a predetermined level of water. Therefore, the degree of opening of each water supply regulation valve is increased. Then, the levels of water in the medium-pressure heat recovery steam generator 22, the high-pressure heat recovery steam generator 21, and the syngas cooler 102 increase gradually.

According to this embodiment, the following operational effects are obtained.

In the above-mentioned configuration, in the first opening degree control, the control device 80 performs control to reduce the degrees of opening of the medium-pressure water supply regulation valve 36a, the high-pressure water supply regulation valve 37a, and the syngas cooler water supply regulation valve 38a such that the sum of the amount of feed water supplied to the medium-pressure bypass line 34 and the high-pressure bypass line 33 through the first spray portion 28 and the second spray portion 29 and the amount of feed water supplied to the medium-pressure heat recovery steam generator 22, the high-pressure heat recovery steam generator 21, and the syngas cooler 102 is equal to or less than the amount of feed water supplied to the medium-pressure heat recovery steam generator 22, the high-pressure heat recovery steam generator 21, and the syngas cooler 102 in the normal operation mode.

With this configuration, the amount of discharge the condensate pump 39 and the medium-pressure water supply pump 40 in the bypass operation mode is equal to or less than the amount of discharge of the condensate pump 35 and the medium-pressure water supply pump 40 in the normal operation mode. Therefore, the maximum capacity of the condensate pump 39 and the medium-pressure water supply pump 40 can be set to the amount of discharge in the normal operation mode. Therefore, the size of the condensate pump 39 and the medium-pressure water supply pump 40 can set to a size corresponding to the amount of discharge in the normal operation mode (that is, the amount of discharge without supplying the feed water to the first spray portion 28 and the second spray portion 29). As a result, it is possible to reduce the capacity of the condensate pump 39 and the medium-pressure water supply pump 40.

Figure 5:
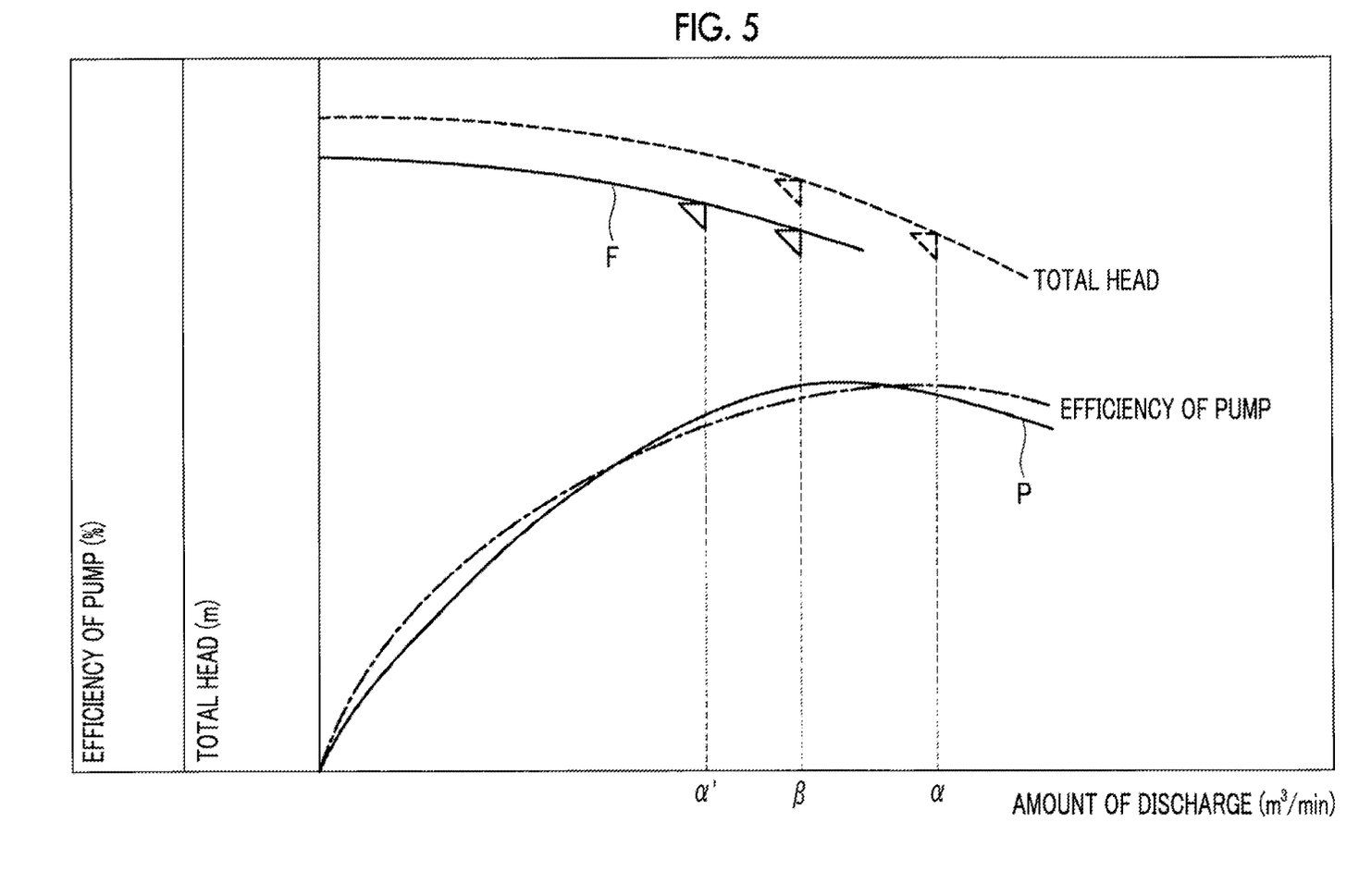
FIG. 5 is a graph illustrating a relationship among the amount of discharge of a pump, the efficiency of the pump, and a total head of the pump.

Further, as illustrated in FIG. 5, in general, the efficiency of the pump becomes lower as the amount of discharge of the pump becomes smaller than the design capacity. Therefore, as the difference between the amount of discharge of the pump in the bypass operation mode and the amount of discharge of the pump in the normal operation mode becomes larger, the efficiency of the pump in the normal operation mode becomes lower. Specifically, as represented by a one-dot chain line in FIG. 5, in a case in which there is a difference between an amount of discharge α in the bypass operation mode and an amount of discharge β in the normal operation mode, the efficiency of the pump in the normal operation mode is lower than the efficiency of the pump in the bypass operation mode.

In this embodiment, in a case in which the amount of discharge in the normal operation mode is equal to or larger than the amount of discharge in the bypass operation mode, it is possible to set the pump such that the efficiency of the pump is the maximum at the amount of discharge in the normal operation mode. Specifically, for example, in a case in which the amount of discharge β in the normal operation mode is equal to or larger than an amount of discharge α' in the bypass operation mode as illustrated in FIG. 5, it is possible to set the condensate pump 39 and the medium-pressure water supply pump 40 such that the efficiency of the pump is the maximum at the amount of discharge β in the normal operation mode, as represented by a solid line P in FIG. 5. Therefore, it is possible to improve the efficiency of the pump in the normal operation mode.

Further, as illustrated in FIG. 5, in general, the total head of the pump becomes higher as the amount of discharge becomes smaller than the design capacity. Therefore, as the difference between the amount of discharge of the pump in the bypass operation mode and the amount of discharge of the pump in the normal operation mode becomes larger, the total head of the pump in the normal operation mode becomes higher. Therefore, in the normal operation mode, the feed water is discharged at a pressure higher than necessary. Specifically, as represented by a dashed line in FIG. 5, in a case in which the pumps are set such that there is a difference between the amount of discharge α in the bypass operation mode and the amount of discharge β in the normal operation mode arid a necessary total head is obtained at the amount of discharge α, the total head of the pump in the normal operation mode is higher than the total head of the pump in the bypass operation mode. Therefore, in the normal operation mode, the feed water is discharged at a pressure higher than necessary.

In this embodiment, in a case in which the amount of discharge in the normal operation mode is equal to or larger than the amount of discharge in the bypass operation mode, it is possible to set the pumps such that a desired total head is obtained at the amount of discharge in the normal operation mode. Specifically, for example, in a case in which the amount of discharge β in the normal operation mode is equal to or larger than the amount of discharge α' in the bypass operation mode as illustrated in FIG. 5, it is possible to set the condensate pump 39 and the medium-pressure water supply pump 40 such that a necessary total head is obtained at the amount of discharge β in the normal operation mode as represented by the solid line F in FIG. 5. As such, it is possible to set the pumps such that the total head of the pump in the normal operation mode becomes an appropriate total head. Therefore, it is possible to prevent the total head of the pump from being higher than necessary in the normal operation mode.

As described above, in this embodiment, it is possible to reduce the capacity of the condensate pump 39 and the medium-pressure water supply pump 40, to improve the efficiency of the pumps at the time of the normal operation, and to prevent a situation in which the driving force of the condensate pump 39 and the medium-pressure water supply pump 40 is too high. Therefore, it is possible to improve the energy efficiency of the entire integrated coal gasification combined cycle 10.

Further, in this embodiment, the second opening degree control is performed after the first opening degree control is performed. With this configuration, a shortage of feed water in the medium-pressure heat recovery steam generator 22, the high-pressure heat recovery steam generator 21, and the syngas cooler 102 is prevented. Therefore, it is possible to avoid problems caused by a reduction in the amount of feed water in the medium-pressure heat recovery steam generator 22, the high-pressure heat recovery steam generator 21, and the syngas cooler 102. The problems caused by the reduction in the amount of feed water in the medium-pressure heat recovery steam generator 22, the high-pressure heat recovery steam generator 21, and the syngas cooler 102 include, for example, the damage of the heat recovery steam generator 20 due to a temperature rise caused by a reduction in the amount of water.

In addition, the invention is not limited to the configurations according to the above-described embodiment and can be appropriately modified without departing from the scope and spirit of the invention.

For example, in the above-described embodiment, the example in which the combined cycle power system according to the invention is applied to the integrated coal gasification combined cycle 10 has been described. However, the invention is not limited thereto. For example, the combined cycle power system according to the invention may be applied to a gas turbine combined cycle (GTCC) using liquefied natural gas as fuel.

Further, in the above-described embodiment, the example in which, in the first opening degree control, the degrees of opening of the medium-pressure water supply regulation valve 36a, the high-pressure water supply regulation valve 37a, and the syngas cooler water supply regulation valve 38a are uniformly regulated at the same timing has been described. However, the invention is not limited thereto. For example, after control to reduce the degrees of opening of the medium-pressure water supply regulation valve 36a and the high-pressure water supply regulation valve 37a is performed, control to reduce the degree of opening of the syngas cooler water supply regulation valve 38a may be performed. This configuration makes it possible to prevent the cavitation of a circulation pump provided in the syngas cooler 102.

Further, in a case in which there is a communication pipe that connects a steam drum of the high-pressure heat recovery steam generator 21 and a steam drum of the medium-pressure heat recovery steam generator 22, control may be performed to reduce the degree of opening of the medium-pressure water supply regulation valve 36a earlier than the high-pressure water supply regulation valve 37a. With this configuration, even in a case in which water runs out in the steam drum of the medium-pressure heat recovery steam generator 22 whose degree of opening is reduced first, it is possible to prevent a situation in which water in the drum of each steam generator runs out since water flows from the steam drum of the high-pressure heat recovery steam generator 21 into the steam drum of the medium-pressure heat recovery steam generator 22 through the communication pipe.

Further, in the above-described embodiment, the example has been described in which, as illustrated in FIG. 3, in the first opening degree control, the degrees of opening of the medium-pressure water supply regulation valve 36a, the high-pressure water supply regulation valve 37a, and the syngas cooler water supply regulation valve 38a are reduced such that the amounts of discharge of the condensate pump 39 and the medium-pressure water supply pump 40 are less than those in the normal operation (that is, in the rated operation of each pump). However, the invention is not limited thereto. For example, in the first opening degree control, the degrees of opening of the medium-pressure water supply regulation valve 36a, the high-pressure water supply regulation valve 37a, and the syngas cooler water supply regulation valve 38a may be reduced such that the amounts of discharge of the condensate pump 39 and the medium-pressure water supply pump 40 are the same as those in the normal operation. That is, the degree of opening of each water supply regulation valve may be reduced such that the amount of feed water supplied to the medium-pressure heat recovery steam generator 22, the high-pressure heat recovery steam generator 21, and the syngas cooler 102 is less than that in the normal operation mode by an amount corresponding to the amount of feed water supplied to the first spray portion 26 and the second spray portion 2S. With this configuration, it is possible to perform the rated operation of the condensate pump 39 and the medium-pressure water supply pump 40 even in the bypass operation mode.

Further, in the first opening degree control, the amount of discharge is not necessarily equal to or less than that in the normal operation mode. The degree of opening of each water supply regulation valve may be reduced to decrease the amount of discharge in the bypass operation mode, thereby reducing the difference between the amount of discharge in the normal operation mode and the amount of discharge in the bypass operation mode. Only this configuration makes it possible to reduce the capacity of the condensate pump 39 and the medium-pressure water supply pump 40, to suppress a reduction in the efficiency of the pumps in the normal operation, and to prevent the driving force of the condensate pump 39 and the medium-pressure water supply pump 40 from being too high. Therefore, it is possible to improve the energy efficiency of the entire integrated coal gasification combined cycle 10.

REFERENCE SIGNS LIST

10: Integrated coal gasification combined cycle (combined cycle power plant)
18: Steam turbine
20: Heat recovery steam generator
32: Turbine bypass line (turbine bypass flow path)
36: Medium-pressure feed water supply line (feed water flow path)
36a: Medium-pressure water supply regulation valve (flow regulation valve)
37: High-pressure feed water supply line (feed water flow path)
37a: High-pressure water supply regulation valve (flow regulation valve)
39: Condensate pump (pump)
40: Medium-pressure water supply pump (pump)
72: Feed water supply line (feed water flow path)
73: Condenser
76: Spray water line (extracted water flow path)
80: Control device (control unit)

The invention claimed is:

1. A combined cycle power plant in which a heat recovery steam generator generates steam using waste heat from an internal combustion engine for power generation and a steam turbine is driven by the steam generated by the heat recovery steam generator, comprising:
    a condenser that condenses the steam which has been used to drive the steam turbine into feed water;
    a feed water flow path that supplies the feed water condensed by the condenser to the heat recovery steam generator;
    a pump that is provided in the feed water flow path and circulates the feed water in the feed water flow path;
    a flow regulation valve that is provided in the feed water flow path and regulates a flow rate of the feed water supplied to the heat recovery steam generator;
    a turbine bypass flow path that bypasses the steam turbine and supplies the steam generated by the heat recovery steam generator to the condenser;
    an extracted water flow path that is branched from the feed water flow path and is connected to the turbine bypass flow path; and
    a control unit having a normal operation mode that supplies the steam generated by the heat recovery steam generator to the steam turbine and a bypass operation mode that supplies the steam generated by the heat recovery steam generator to the condenser through the turbine bypass flow path,
    wherein, in the normal operation mode, the control unit circulates the feed water in the feed water flow path using the pump, and in the bypass operation mode, the control unit supplies the feed water to the turbine bypass flow path through the extracted water flow path using the same pump used in the normal operation mode and performs first opening degree control to control a degree of opening of the flow regulation valve such that an amount of feed water supplied to the heat recovery steam generator is less than that in the normal operation mode.

2. The combined cycle power plant according to claim 1, wherein, in the first opening degree control, the control unit controls the degree of opening of the flow regulation valve such that a sum of an amount of feed water supplied to the turbine bypass flow path and the amount of feed water supplied to the heat recovery steam generator is equal to or less than the amount of feed water supplied to the heat recovery steam generator in the normal operation mode.

3. The combined cycle power plant according to claim 1, wherein, in the bypass operation mode, after performing the first opening degree control, the control unit performs second opening degree control to control the degree of opening of the flow regulation valve such that an amount of feed water held by the heat recovery steam generator is maintained at a predetermined flow rate.

4. A method for controlling a combined cycle power plant in which a steam turbine is driven by steam generated by a heat recovery steam generator using waste heat from an internal combustion engine for power generation, wherein the combined cycle power plant includes:
a condenser that condenses the steam which has been used to drive the steam turbine into feed water;
a feed water flow path that supplies the feed water condensed by the condenser to the heat recovery steam generator;
a pump that is provided in the feed water flow path and circulates the feed water in the feed water flow path;
a flow regulation valve that is provided in the feed water flow path and regulates a flow rate of the feed water supplied to the heat recovery steam generator;
a turbine bypass flow path that bypasses the steam turbine and supplies the steam generated by the heat recovery steam generator to the condenser;
an extracted water flow path that is branched from the feed water flow path and is connected to the turbine bypass flow path; and
a control unit having a normal operation mode that supplies the steam generated by the heat recovery steam generator to the steam turbine and that circulates the feed water in the feed water flow path using the pump, and a bypass operation mode that supplies the steam generated by the heat recovery steam generator to the condenser through the turbine bypass flow path, and the method comprises:
a feed water extraction step of supplying the feed water to the turbine bypass flow path through the extracted water flow path in the bypass operation mode using the same pump used in the normal operation mode; and
a first opening degree control step of controlling a degree of opening of the flow regulation valve such that an amount of feed water supplied to the heat recovery steam generator in the bypass operation mode is less than that in the normal operation mode.

5. The method for controlling a combined cycle power plant according to claim 4,
wherein, in the first opening degree control step, the degree of opening of the flow regulation valve is controlled such that a sum of an amount of feed water supplied to the turbine bypass flow path and the amount of feed water supplied to the heat recovery steam generator is equal to or less than the amount of feed water supplied to the heat recovery steam generator in the normal operation mode.

6. The method for controlling a combined cycle power plant according to claim 4, further comprising:
a second opening degree control step of controlling the degree of opening of the flow regulation valve such that an amount of feed water held by the heat recovery steam generator is maintained at a predetermined flow rate after the first opening degree control step in the bypass operation mode.

\* \* \* \* \*